(12) United States Patent
Fukushima

(10) Patent No.: US 9,839,957 B2
(45) Date of Patent: Dec. 12, 2017

(54) CERAMIC CORE, MANUFACTURING METHOD FOR THE SAME, MANUFACTURING METHOD FOR CASTING USING THE CERAMIC CORE, AND CASTING MANUFACTURED BY THE METHOD

(71) Applicant: HITACHI METALS, LTD., Tokyo (JP)

(72) Inventor: Hideko Fukushima, Shimane (JP)

(73) Assignee: HITACHI METALS, LTD., Tokyo (JP)

( * ) Notice: Subject to any disclaimer, the term of this patent is extended or adjusted under 35 U.S.C. 154(b) by 278 days.

(21) Appl. No.: 14/474,903

(22) Filed: Sep. 2, 2014

(65) Prior Publication Data

US 2015/0072163 A1 Mar. 12, 2015

(30) Foreign Application Priority Data

Sep. 10, 2013 (JP) .................................. 2013-187337

(51) Int. Cl.
```
B22C 1/00      (2006.01)
B22C 9/10      (2006.01)
B22C 9/04      (2006.01)
C04B 35/14     (2006.01)
B22C 7/02      (2006.01)
```

(52) U.S. Cl.
CPC ................ *B22C 1/00* (2013.01); *B22C 7/023* (2013.01); *B22C 9/046* (2013.01); *B22C 9/10* (2013.01); *C04B 35/14* (2013.01); *C04B 2235/3217* (2013.01); *C04B 2235/3248* (2013.01); *C04B 2235/5436* (2013.01); *C04B 2235/5463* (2013.01); *C04B 2235/6022* (2013.01); *Y10T 428/12* (2015.01)

(58) Field of Classification Search
CPC .................................... B22C 9/10; B22C 1/00
USPC ........................................................ 164/369
See application file for complete search history.

(56) References Cited

U.S. PATENT DOCUMENTS

| | | | |
|---|---|---|---|
| 4,093,017 A | 6/1978 | Miller, Jr. et al. | |
| 4,164,424 A | 8/1979 | Klug et al. | |
| 4,184,885 A * | 1/1980 | Pasco et al. | B22C 9/10 164/132 |
| 4,191,720 A * | 3/1980 | Pasco et al. | B22C 1/08 106/38.9 |
| 5,014,763 A * | 5/1991 | Frank | C04B 35/622 164/15 |
| 5,043,014 A | 8/1991 | Flochel | |
| 5,120,482 A | 6/1992 | Flochel | |
| 5,830,767 A * | 11/1998 | Bauman et al. | G01N 33/551 422/502 |
| 6,238,601 B1 * | 5/2001 | Salomonson et al. | A61O 5/10 156/182 |
| 2009/0256461 A1* | 10/2009 | Walker, Jr. | H01T 21/02 313/137 |
| 2013/0199749 A1 | 8/2013 | Moschini et al. | |
| 2015/0321247 A1 | 11/2015 | Fukushima | |

FOREIGN PATENT DOCUMENTS

| | | | |
|---|---|---|---|
| EP | 0 179 649 | 4/1986 | |
| EP | 2 740 550 | 6/2014 | |
| JP | 01-245941 | 10/1989 | |
| JP | 2012-161805 A * | 8/2012 | B22C 9/10 |
| JP | 2013-71169 A | 4/2013 | |
| KR | 10-2012-0139199 | 12/2012 | |
| WO | 2011/061593 | 5/2011 | |
| WO | 2013/018393 A | 2/2013 | |

OTHER PUBLICATIONS

Extended European Search Report for Patent Application No. 14183785.6-1354, dated Mar. 6, 2015.

Japanese Office Action in respect to Japanese Application No. 2013-187337 with English Translation, dated May 26, 2017.

* cited by examiner

*Primary Examiner* — Kevin P Kerns

(74) *Attorney, Agent, or Firm* — Greenblum & Bernstein, P.L.C.

(57) ABSTRACT

A ceramic core includes sintered ceramic powder and a hole opening on a surface of the ceramic core and having an opening portion with a maximum size of 100 μm or less. A manufacturing method for a ceramic core includes: preparing an injection molding composition by mixing ceramic powder and a binder; manufacturing a ceramic compact by performing the injection molding of the injection molding composition; and manufacturing a ceramic core by sintering the ceramic compact, wherein cumulative percentage of coarse powder with a particle diameter of more than 50 μm included in the ceramic powder is 30% or less on an integrated volume particle size distribution curve of the ceramic powder.

4 Claims, 6 Drawing Sheets

CERAMIC CORE, MANUFACTURING METHOD FOR THE SAME, MANUFACTURING METHOD FOR CASTING USING THE CERAMIC CORE, AND CASTING MANUFACTURED BY THE METHOD

CROSS-REFERENCE TO RELATED APPLICATION

This application claims priority from Japanese Patent Application No. 2013-187337 filed with the Japan Patent Office on Sep. 10, 2013, the entire content of which is hereby incorporated by reference.

BACKGROUND

1. Technical Field

The present disclosure relates to a ceramic core, a manufacturing method for the same, a manufacturing method for a casting using the ceramic core, and a casting manufactured by the manufacturing method.

2. Related Art

It has been known that the ceramic core is used for manufacturing a hollow casting. As the hollow casting, a blade for a gas turbine (turbine blade) formed of Ni-based heat-resistant alloy, for example, has been known. This blade has a hollow cooling hole on the inside. This hollow cooling hole may have the complicated and precise structure for increasing the cooling effect. Such a blade can be manufactured using a ceramic core with the shape corresponding to the hollow cooling hole to be formed by the lost wax precision casting method or the like. For example, FIG. 1 illustrates the ceramic core having a blade portion 1 and a dovetail 2 for forming the hollow turbine blade.

A known example of such a ceramic core is one (JP-A-01-245941) including 60 to 85 mass % of fused silica, 15 to 35 mass % of zircon, and 1 to 5 mass % of cristobalite is known. Moreover, a ceramic core (specification of EP Patent No. 0179649) including 60 to 80 mass % of fused silica powder, up to 15 mass % of yttria, and up to 0.2 mass % of alkali metal. As another example, furthermore, there is known a ceramic core (specification of U.S. Pat. No. 4,093,017) formed using fused silica and colloidal silica stabilized with sodium.

In JP-A-01-245941, for example, there are the following descriptions: the ceramic core still has the sufficient mechanical strength at a casting temperature of approximately 1500° C.; since the remarkable change in dimension of the ceramic core during the casting is suppressed, the ceramic core exhibits the excellent dimension stability; and after the casting, this ceramic core is easily eluted from the casting. The specification of EP Patent No. 0179649 describes that the ceramic core has a room-temperature strength of 12 MPa at maximum and has the property of substantially retaining its shape even at a temperature of 1675° C., which is much higher than 1500° C. Furthermore, the specification of U.S. Pat. No. 4,093,017 describes that the ceramic core has a room-temperature strength of approximately 7 MPa.

SUMMARY

In a ceramic core including a sintered body of ceramic powder, an opening portion of a hole present on a surface of the ceramic core has a maximum size of 100 μm or less.

DETAILED DESCRIPTION

Figure 1:
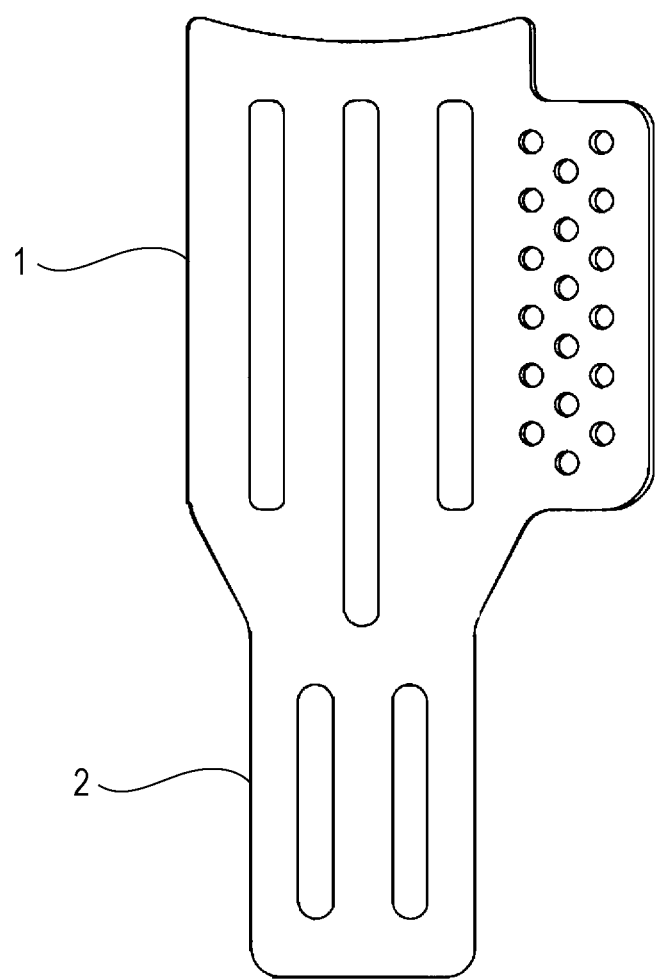
FIG. 1 is a diagram illustrating an example (external appearance) of a ceramic core according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2A:
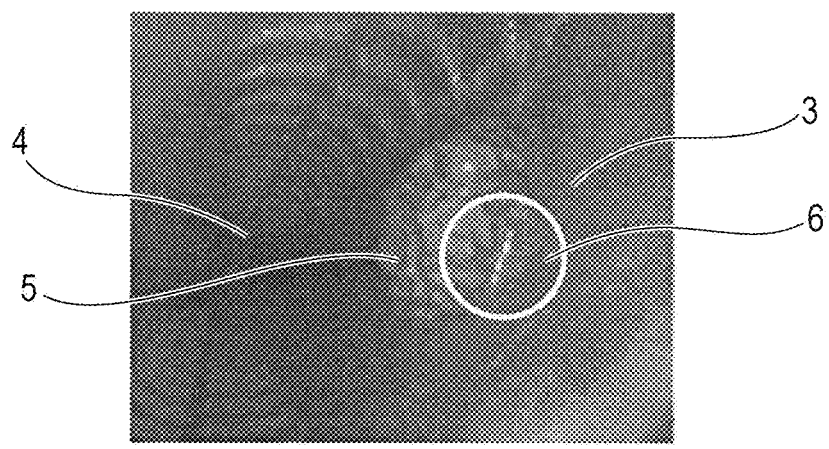
FIG. 2A is a diagram illustrating an example of a projection defect.
Figure 2B:
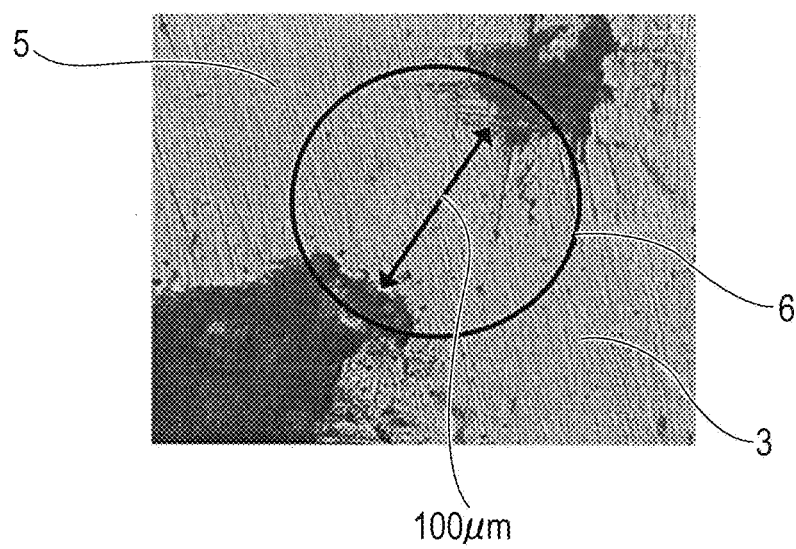
FIG. 2B is a magnified sectional view of a base portion of the projection defect illustrated in FIG. 2A.

A hollow casting (turbine blade) was fabricated by a lost wax precision casting process using a ceramic core according to the conventional art. Of the hollow portions of some castings, for example, a portion in contact with the ceramic core had a projection defect as illustrated in FIGS. 2A and 2B. In a hollow portion 4 of a casting 3 illustrated in FIG. 2A, a projection defect 5 projects from the surface of the casting 3 toward the hollow portion 4. As illustrated in FIG. 2B, a base portion 6 of the projection defect 5 and the surface of the casting 3 are connected through a portion with a largely constricted sectional shape. This indicates that the projection defect of the hollow portion of this casting is generated through the process as below. In other words, at the casting, molten metal (melted metal) enters the inside of the ceramic core from the surface (insertion of molten metal). Next, the inserted molten metal is coarsened and then solidified. The details are described below. In embodiments of the present disclosure, there are provided a ceramic core, a manufacturing method for the same, and a manufacturing method for a casting using the ceramic core, which can suppress the formation of the projection defect in the hollow portion of the aforementioned casting.

The present inventor has found that the above problems can be prevented when the size of the opening portion of the hole opening on the surface of the ceramic core is less than or equal to a predetermined size.

That is to say, a ceramic core according to an embodiment of the present disclosure (the present ceramic core) includes a sintered body of ceramic powder, and an opening portion of a hole present on a surface of the ceramic core has a maximum size of 100 μm or less.

A fracture surface of the present ceramic core may include transgranular fracture particle of ceramic powder.

In addition, the present ceramic core may have a relative density of 60% or more.

A manufacturing method for a ceramic core according to an embodiment of the present disclosure (the present core manufacturing method) includes: preparing an injection molding composition by mixing ceramic powder and a binder; manufacturing a ceramic compact by performing the injection molding of the injection molding composition; and manufacturing a ceramic core by sintering the ceramic compact, wherein cumulative percentage of coarse powder with a particle diameter of more than 50 μm included in the ceramic powder is 30% or less on an integrated volume particle size distribution curve of the ceramic powder.

In addition, the cumulative percentage of the micropowder with a particle diameter of 5 μm or less in the ceramic powder may be 10 to 40%.

Moreover, a hollow casting can be manufactured using the present ceramic core.

That is to say, a manufacturing method for a casting using the present ceramic core includes: manufacturing a lost-foam pattern by coating the present ceramic core with a lost-foam material; manufacturing a mold by coating the lost-foam pattern with a refractory; filling the mold with a molten metal material; manufacturing a casting original model by solidifying the metal material; and providing a hollow casting by removing the mold and the ceramic core from the casting original model.

In addition, a hollow casting can be manufactured using a ceramic core manufactured by the present core manufacturing method.

That is to say, a manufacturing method for a casting using a ceramic core manufactured by the present core manufacturing method includes: manufacturing a lost-foam pattern by coating the ceramic core manufactured by the present core manufacturing method with a lost-foam material; manufacturing a mold by coating the lost-foam pattern with a refractory;

filling the mold with a molten metal material; manufacturing a casting original model by solidifying the metal material; and providing a hollow casting by removing the mold and the ceramic core from the casting original model.

Furthermore, a hollow casting can be manufactured by the manufacturing method for a casting using the ceramic core.

By the use of the present ceramic core, the formation of the projection defect at the surface of the casting that is in contact with the ceramic core can be suppressed. Moreover, by the suppression of the formation of the projection defect in the hollow portion, an excellent hollow casting can be formed.

In an embodiment of the present disclosure, the maximum size of the opening portion of the hole present on the surface of the present ceramic core including the sintered body of the ceramic powder is 100 μm or less. Thus, the formation of the projection defect on the surface of the casting that is in contact with the present ceramic core can be suppressed. By the suppression of the formation of the projection defect in the hollow portion due to the use of the present ceramic core, therefore, an excellent hollow casting can be formed. Note that the hole of the present ceramic core may have an opening portion shaped like an opening of a bag and have a space expanding in a bag-like shape from the surface to the inside. The hole of the present ceramic core may be the hole having a space depressed from the surface to the inside, which is formed by the falloff of a large particle.

The ceramic compact may have a hole formed inside. In the case where a comparatively large hole is formed near the surface of the ceramic compact, the hole may be formed on the surface in the process of degreasing and sintering. In this case, the opening portion of the hole is formed on the surface of the ceramic core. In the case where the opening portion of the hole is formed on the surface of the ceramic core in this manner, the sintered structure in, or near the shell forming the periphery of the hole tends to be formed as a fragile porous structure due to the local deterioration in relative density.

The periphery of the opening portion of the hole as above is formed by the connected structure including a number of sintered ceramic particles with various shapes and diameters. Therefore, the shape of the periphery of the opening portion is not simple. In other words, the shape and size of the individual ceramic particle vary. Therefore, the periphery of the opening portion of the hole has various shapes. In view of this point, the present inventor has considered that the shape of the periphery of the opening portion of the hole can be approximated to, for example, a circular shape, an elliptical shape, a polygonal shape such as a triangle or a rectangle, or a long, thin needle-like shape.

The present inventor has approximated the shape of the periphery of the opening portion of the hole opening on the surface of the present ceramic core and defined the maximum size of the opening portion as follows:

if the periphery of the opening portion can be approximated to the circular shape, the maximum size of the opening portion corresponds to the diameter thereof;

if the periphery of the opening portion can be approximated to the elliptical shape, the maximum size of the opening portion corresponds to the major diameter thereof;

if the periphery of the opening portion can be approximated to the triangular shape, the maximum size of the opening portion corresponds to the longest side (the hypotenuse or the height) thereof;

if the periphery of the opening portion can be approximated to the rectangular shape or the polygonal shape with five or more sides, the maximum size of the opening portion corresponds to the longest diagonal line thereof; and if the periphery of the opening portion can be approximated to the needle-like shape, the maximum size of the opening portion corresponds to the length of the needle.

Figure 3A:
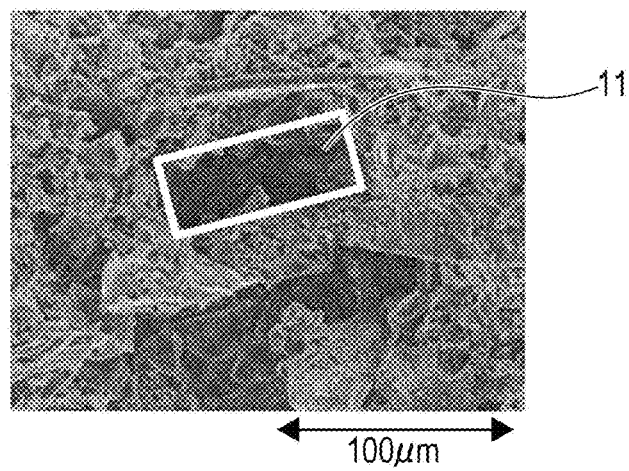
FIGS. 3A to 3C are diagrams (photographs) illustrating a hole opening on a surface of a ceramic core, in which the shape of the periphery of the opening portion of the hole is approximated to a simplified shape.
Figure 3B:
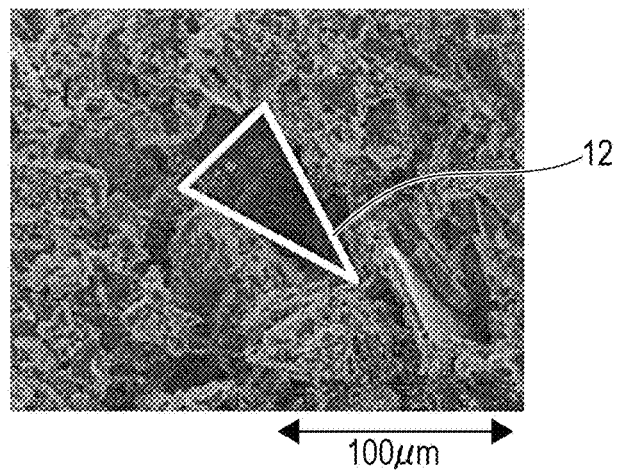
Figure 3C:
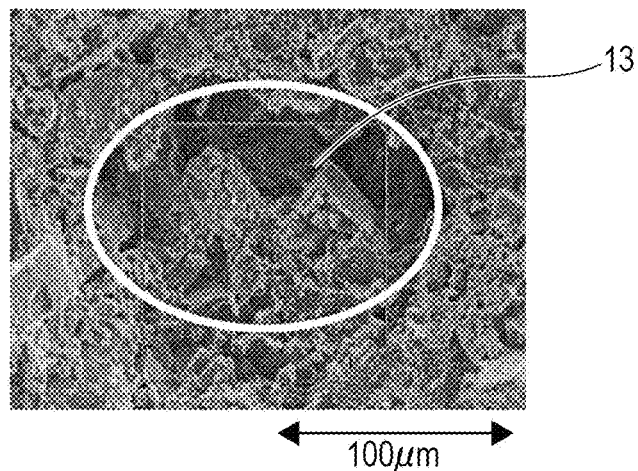

FIGS. 3A to 3C illustrate an example of the hole having the opening portion on the surface of the ceramic core. The periphery of the opening portion of a hole 11 illustrated in FIG. 3A can be approximated to, for example, a rectangular shape to make the diagonal line to correspond to the maximum size of the opening portion. Similarly, the periphery of the opening portion of a hole 12 illustrated in FIG. 3B can be approximated to, for example, a triangular shape to make the hypotenuse or the height correspond to the maximum size of the opening portion. Moreover, the periphery of the opening portion of a hole 13 illustrated in FIG. 3C can be approximated to, for example, an elliptical shape to make the major diameter correspond to the maximum size of the opening portion.

A number of projection defects were actually analyzed in detail. With respect to the base portion of the projection defect (the base portion is a largely constricted portion serving as a boundary region between the projection defect and the normal portion of the casting), the obtained analytical results were as follows: the distance between the two points that are the farthest from each other on the contour at the section of the base portion is greater than 100 μm as illustrated in the base portion 6 of FIG. 2B.

Figure 4A:
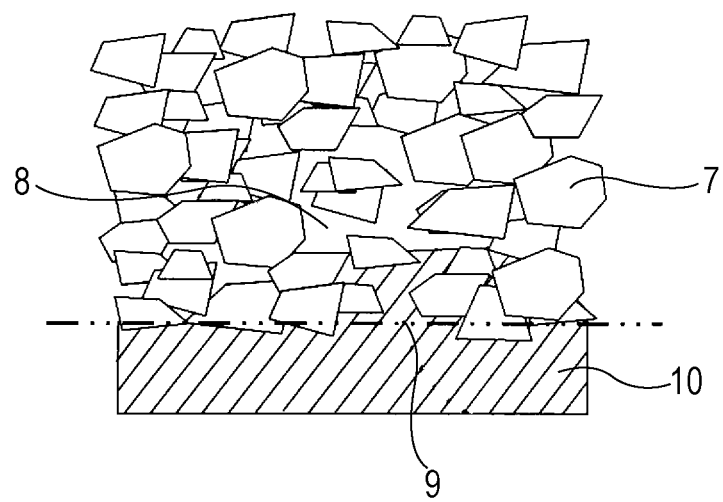
FIGS. 4A and 4B are conceptual diagrams illustrating the process of forming the projection defect.
Figure 4B:
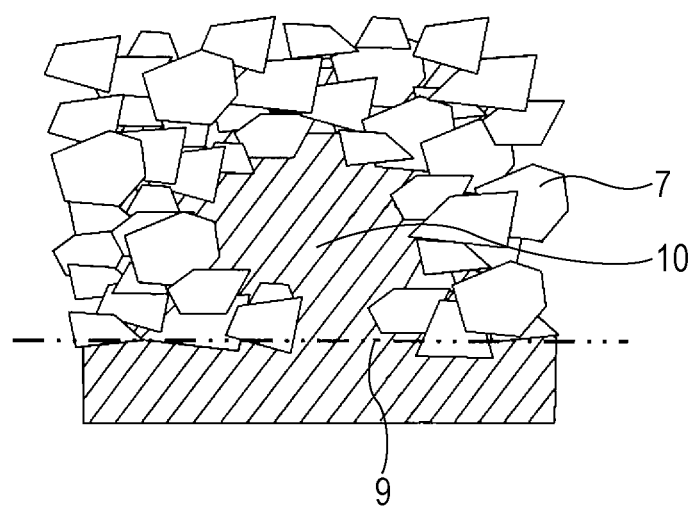

The projection defect with the base portion having the largely constricted shape may be formed through the process as illustrated in FIG. 4A and FIG. 4B. It is assumed that the ceramic core, which includes a sintered body of ceramic powder 7 has, for example, a hole 8 near the surface thereof and the surface is provided with an opening portion that communicates with the hole 8 (i.e., the opening portion of the hole 8). In the case of using a mold that incorporates such a ceramic core, molten metal 10 is led to the opening portion of the hole 8 that communicates with a surface 9 of the ceramic core illustrated by the two-dot dashed line in FIG. 4A and FIG. 4B. On this occasion, when the opening portion has a size (or maximum size) of greater than or equal to a predetermined size, the molten metal 10 enters the hole 8 through the opening portion as illustrated in FIG. 4A (insertion of molten metal 10).

Moreover, the molten metal 10 having entered the hole 8 disconnects the sintered bond of the comparatively fragile porous structure that forms the shell of the hole 8. Moreover, the molten metal 10 fills the hole while expanding the original capacity of the hole 8 as illustrated in FIG. 4B. The molten metal 10 is gradually solidified and as a result, becomes a coarse condensate. In other words, it has been understood that the projection defect is the coarse condensate of the molten metal having entered the hole with the comparatively large opening portion. This defect is formed on the surface of the hollow portion of the casting as illustrated in FIGS. 2A and 2B.

The ceramic core was actually manufactured and casting was conducted using the core. As a result, in the case of using the ceramic core where the opening portion of the hole with a maximum size of more than 100 μm was not observed on the surface, the excellent casting whose projection defect in the hollow portion was suppressed was obtained. In other words, it has been clarified that the insertion of the molten metal into the hole and the formation of the projection defect can be suppressed when the maximum size of the opening portion of the hole present on the surface of the ceramic core is less than or equal to 100 μm.

Moreover, the insertion of the molten metal is suppressed more easily as the maximum size of the opening portion of the hole present on the surface of the ceramic core is smaller. In other words, the molten metal collides against the surface of the ceramic core straightly or scratches intensively the surface of the ceramic core depending on the casting plan or metal pouring condition in the casting. Therefore, when the maximum size of the opening portion of the hole that is in contact with the molten metal is too large, the shell forming the hole and the periphery of the opening portion collapse largely due to the contact with the molten metal. Therefore, the collapse as above can be more suppressed as the maximum size of the opening portion of the hole is smaller. This maximum size may be, for example, 30 μm or less or 10 μm or less.

The present ceramic core can be manufactured by a manufacturing method as below. In other words, this manufacturing method includes a step of preparing an injection molding composition by mixing ceramic powder and a binder, a step of manufacturing a ceramic compact by performing the injection molding of the injection molding composition, and a step of manufacturing a ceramic core by sintering the ceramic compact. Moreover, the cumulative percentage of the coarse powder with a particle diameter of more than 50 μm included in the ceramic powder is 30% or less on the integrated volume particle size distribution curve of the ceramic powder.

In the ceramic compact, a plurality of powders (coarse powders) with comparatively large particle diameter supports each other to form a bubble and a binder incorporation structure easily. In the ceramic core subjected to the degreasing and sintering steps, the hole structure due to the incorporation structure may be formed. The hole formed due to this hole structure may have a large capacity. In the case where the hole with the large capacity is present near the surface of the ceramic compact, the opening portion of the hole with a large opening size (a maximum size) is easily formed on the surface of the ceramic core. As the cumulative percentage of the coarse powder with the large particle diameter is reduced, the smaller hole is formed. Specifically, when the cumulative percentage of the coarse powder with a particle diameter of more than 50 μm exceeds 30%, the cumulative percentage of the powder (micropowder) with comparatively small particle diameter is reduced relatively. Therefore, the micropowder that can fill the bubble and the binder incorporation structure is reduced. As a result, the hole with large capacity is formed due to the bubble and the binder incorporation structure. This increases the possibility of forming the hole with the opening portion whose opening size (maximum size) is more than 50 μm in the ceramic core.

The aforementioned integrated volume particle size distribution curve represents the proportion (%) of the amount of particles with the particle size of less than or equal to the particular particle size included in the entire powder relative to the total amount of powder. The horizontal axis of this integrated distribution curve represents the particle diameter (particle size). The vertical axis thereof represents the amount of particles with the particle diameter of less than or equal to the particle diameter expressed in cumulative percentage. In an embodiment of the present disclosure, the particle size distribution based on the volume is obtained according to "laser diffraction/scattering method". Specifically, the particle size distribution based on the volume is obtained using the laser diffraction/scattering method particle size distribution measuring apparatus (Microtrac MT3000 manufactured by NIKKISO CO., LTD). The average particle diameter is also obtained by the similar method. In other words, the particle diameter corresponding to a half of the cumulative percentage is employed as the average particle diameter.

At the fracture surface of the present ceramic core, the transgranular fracture particle of the ceramic powder may be observed. In other words, the fracture surface of the present ceramic core may include the transgranular fracture particle of the ceramic powder. In the ceramic core, not the intergranular fracture but the transgranular fracture may occur. This is because the sintering increases the connecting strength between the particles included in the ceramic powder (ceramic particles) to such a degree that the transgranular fracture occurs. As the connecting strength between the ceramic particles is higher, it becomes more difficult for the molten metal having entered the hole to disconnect the bond between the ceramic powders in, and near the shell forming the periphery of the hole. Therefore, the peripheral fracture of the opening and the expansion of hole capacity that are caused due to the molten metal can be suppressed. Therefore, the ceramic core in which the transgranular fracture occurs rather than the intergranular fracture relative to the external pressure is advantageous in preventing the formation of the projection defect on the casting.

The ceramic core with the sintered connected structure of such a degree that the transgranular fracture is caused in the ceramic powder can be formed using the ceramic powder as below. In other words, in this ceramic powder, the cumulative percentage of the coarse powder with a particle diameter of more than 50 μm included in the ceramic powder on the integrated volume particle size distribution curve of the ceramic powder is 30% or less. In this ceramic powder, the cumulative percentage of the micropowder with a particle diameter of 5 μm or less may be 10 to 40%. When the ceramic compact is manufactured from the injection molding composition through the injection molding, the following operation effect can be obtained easily by the use of the more microscopic micropowder with a particle diameter of 5 μm or less. In other words, the bubble and the binder incorporation structure formed by the approach of the plural coarse powders can be satisfied (filled) with the micropowder. Therefore, the capacity of the hole due to the bubble and the binder incorporation structure formed when the ceramic compact is sintered can be reduced further. Therefore, the use of the ceramic powder including the micropowder as appropriate makes it easy to set the opening size (maximum size) of the opening portion of the hole formed in the ceramic core to be 100 μm or less. Moreover, it becomes easy to form the firm sintered connected structure with high mechanical strength.

The operation effect of filling the bubble and the binder incorporation structure with the powder (micropowder) with the comparatively small particle diameter may be considered important. In that case, the ceramic powder containing a large amount of micropowder with smaller particle diameter may be used. On the other hand, the elution of the ceramic core and the prevention of the deterioration in dimension accuracy due to the contraction of the ceramic core may be considered important. In this case, the use of the ceramic powder containing microscopic powder may be suppressed. In particular, the cumulative percentage of the micropowder with a particle diameter of 1 μm or less may be suppressed to be less than 5%. When the cumulative percentage of the micropowder with a particle diameter of 1 μm or less is less than 5%, the variation in outer dimension and the elution in the alkali aqueous solution of the ceramic core can be suppressed. Note that if the cumulative percentage of the micropowder with a particle diameter of 5 μm or less is more than 40%, attention may be paid to the elution and the dimension accuracy for the contraction of the ceramic core.

Moreover, the present ceramic core may have a relative density of 60% or more as the sintered body. When the relative density is 60% or more, the practical mechanical strength at room temperature and high temperature required for the ceramic core is increased. Moreover, it becomes easy to form the ceramic core so as to reduce the maximum size of the opening portion of the hole present on the surface of the ceramic core. Note that the relative density referred to in the embodiment of the present disclosure is the relative density defined in JIS-Z2500. In other words, this relative density is the ratio between the actual density and the theoretical density, i.e., the value which is obtained by dividing the actual density by the theoretical density and represented in percentage. Here, the actual density is the value obtained by dividing the mass of the ceramic core in reality by the volume calculated from the dimension thereof. As for the theoretical density, it is assumed that various kinds of powder constituting the ceramic powder, such as silica ($SiO_2$), zircon ($ZrSiO_4$), or alumina ($Al_2O_3$), is present independently in the sintered structure of the ceramic core. The theoretical density is obtained from the mixing composition of the used raw material based on the density in theory.

The ceramic powder used in an embodiment of the present disclosure can be selected in consideration of the mechanical strength, the controllability over the variation in external dimension, the leachability in the alkali aqueous solution, etc. of the ceramic core. For example, the ceramic powder to be used is selected from among the silica powder ($SiO_2$), the alumina powder ($Al_2O_3$), and the zircon powder ($ZrSiO_4$). The ceramic powder to be used may be the ceramic powder with a single composition or the mixed powder of the ceramic powder with a plurality of compositions. For example, the silica powder ($SiO_2$) with the powder composition including 90 mass % or more of the non-crystalline silica (fused silica) powder in 100 mass % of silica powder can be used. The silica powder may have the powder composition that is entirely the non-crystalline silica powder. The mixed powder of the ceramic powder to be used may be prepared by mixing 0.1 to 15.0 mass % of alumina powder and 0.5 to 35.0 mass % of zircon powder in the silica powder.

The aforementioned ceramic powder with the single composition and the mixed powder of the ceramic powder with the plural compositions may contain 0.005 to 0.1 mass % of at least one kind of potassium and sodium. It is expected that by the inclusion of 0.005 to 0.1 mass % of at least one kind of potassium and sodium, the mechanical characteristic of the high-temperature range of the ceramic core is improved and the potassium or sodium operates as the sintering auxiliary agent that promotes the densification of the ceramic core.

EXAMPLES

The present ceramic core and the manufacturing method for the same are described below with reference to the specific examples thereof. However, the scope of the embodiment of the present disclosure is not limited by the specific examples described below.

(Ceramic Powder)

Procedures described below were used to prepare two kinds of mixed powders (represented as "sample A" and "sample B" in FIG. 5A) as the ceramic powders used in the embodiments of the present disclosure. First, fused silica powder ($SiO_2$) was mixed with alumina powder ($Al_2O_3$) and zircon powder ($ZrSiO_4$). Next, the potassium composition and the sodium composition were adjusted using potassium hydroxide and sodium hydroxide so that the total content was set to 0.1 mass % or less. For comparison, the mixed powder used in the conventional technique was also prepared. This mixed powder is the ceramic powder ("sample C" in FIG. 5B), whose entire amount is the fused silica powder ($SiO_2$).

Figure 5A:
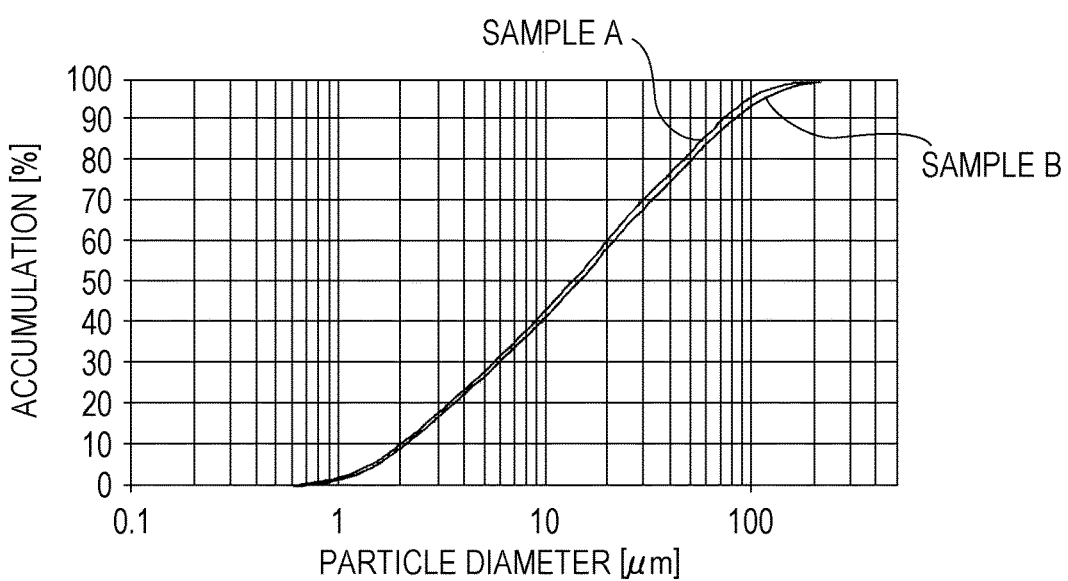
FIGS. 5A and 5B are graphs in which each curve represents an integrated volume particle size distribution curve of the particles of the ceramic powder.

FIG. 5A illustrates the integrated volume particle size distribution curve of the particles of the two kinds of the mixed powder (ceramic powder) used in the embodiment of the present disclosure. The content of the zircon powder ($ZrSiO_4$) of the two kinds of mixed powder, which are indicated by the sample A and the sample B, is different. The composition of the mixed powder in the sample A is: 1 mol % (1.5 mass %) of $Al_2O_3$, 7 mol % (18.6 mass %) of $ZrSiO_4$, and the rest is $SiO_2$. The composition of the mixed powder in the sample B is: 1 mol % (1.4 mass %) of $Al_2O_3$, 11 mol % (27.2 mass %) of $ZrSiO_4$, and the rest is $SiO_2$. In the sample A, the cumulative percentage of the coarse powder with a particle diameter of more than 50 μm is 19%, and the cumulative percentage of the micropowder with a particle diameter of 5 μm or less is 28%. In the sample A, moreover, the cumulative percentage of the more microscopic micropowder with a particle diameter of 1 μm or less is less than 2%. In the sample B, the cumulative percentage of the coarse powder with a particle diameter of more than 50 µm is 21%, and the cumulative percentage of the micropowder with a particle diameter of 5 µm or less is 27%. In the sample B, moreover, the cumulative percentage of the more microscopic micropowder with a particle diameter of 1 µm or less is less than 2%.

Figure 5B:
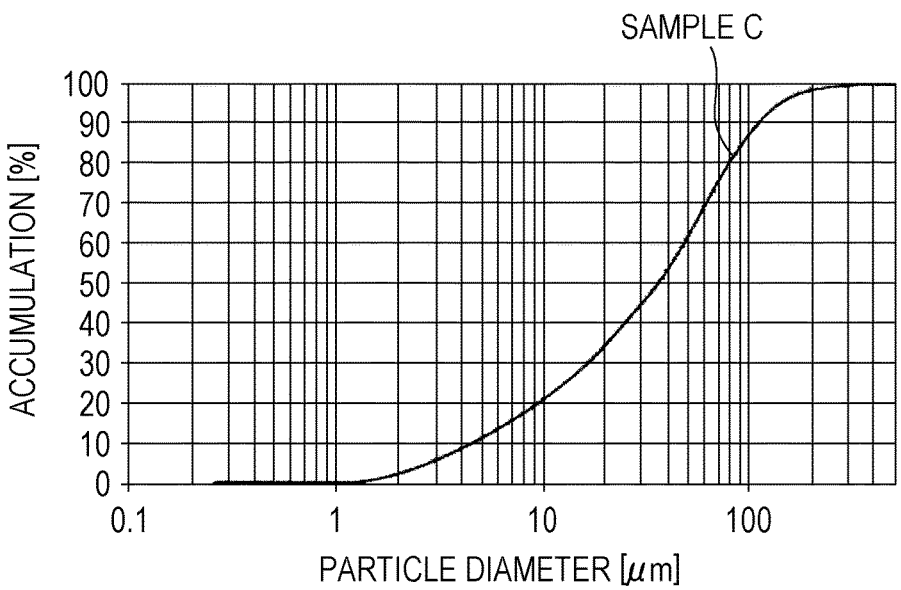

FIG. 5B illustrates the integrated volume particle size distribution curve of the particle of the ceramic powder used in the conventional technique. The ceramic powder with the single composition (fused silica powder) indicated by the sample C has the particle structure as below. The cumulative percentage of the coarse powder with a particle diameter of more than 50 µm is 40%. The cumulative percentage of the micropowder with a particle diameter of 5 µm or less is 12%. The cumulative percentage of the more microscopic micropowder with a particle diameter of 1 µm or less is less than 1% (almost 0%).

(Injection Molding Composition)

An injection molding composition A and an injection molding composition B for forming the ceramic compact used in the embodiment of the present disclosure were prepared. For comparison, an injection molding composition C for forming the ceramic compact used in the conventional technique was also prepared. These injection molding compositions were prepared by mixing their respective ceramic powders (sample A, sample B, and sample C) with the binder. Specifically, the injection molding composition A, the injection molding composition B, and the injection molding composition C were respectively obtained by sufficiently mixing 68 vol % of the sample A, the sample B, and the sample C and 32 vol % of binder including paraffin and styrene-based thermoplastic elastomer with the use of a mixing stirrer.

(Ceramic Compact)

A mold with a cavity corresponding to the shape of the ceramic core illustrated in FIG. 1 was used to manufacture ceramic compacts A and B used in the embodiment of the present disclosure. Similarly, the same mold was used to manufacture a ceramic compact C used in the conventional technique. Specifically, the injection molding compositions A, B, and C were injected to the inside of the mold at a pressure of approximately 7 MPa. In that state, the injection molding compositions A, B, and C were solidified in the mold. After that, the solids were separated from the mold to provide the ceramic compacts A, B, and C.

(Ceramic Core)

First, the ceramic compacts A, B, and C were subjected to a low-temperature degreasing step. Specifically, the binder was removed from each of the ceramic compacts A, B, and C (low-temperature degreasing) by increasing the temperature of the degreasing furnace from room temperature to a target temperature (approximately 240° C.). After the target temperature was attained, the temperature was decreased without maintaining the temperature in particular. In this low-temperature degreasing step, the temperature-rising speed was adjusted and the amount of removing the binder was adjusted so that the amount of binder was within 80 to 90% in mass ratio before and after the low-temperature degreasing. Therefore, there was no inconvenience in handling the ceramic compacts (half-degreased molded bodies A, B, and C) after the low-temperature degreasing. Next, a high-temperature degreasing step was conducted. In other words, the ceramic compacts subjected to the low-temperature degreasing step (half-degreased molded bodies A, B, and C) were placed into a sintering furnace, and the temperature in the sintering furnace was increased from the room temperature to the target temperature (approximately 580° C.). After the target temperature was attained, the temperature was maintained (for about five hours) to remove the remaining binder from the half-degreased molded bodies A, B, and C (high-temperature degreasing). Subsequently, the temperature of the sintering furnace was increased to about 1300° C. and the temperature was then maintained for about two hours. Consequently, the samples A, B, and C were sintered, and ceramic cores A, B, and C in their plurality form can be obtained.

The relative densities of the group of ceramic cores A and the group of ceramic cores B, which were manufactured through the above process, were in the range of 68 to 72%, respectively. The relative density of the group of ceramic cores C was in the range of 58 to 62%. The entire observable surface of each of the groups of ceramic cores A, B, and C was observed using a magnifying glass. Moreover, the area where the opening portion of the hole was considered to be present was observed in detail at high magnification. As a result, the large opening portion with a maximum size of more than 100 µm was not observed in the group of ceramic cores A and the group of ceramic cores B. As illustrated in FIG. 3A and FIG. 3B, some opening portions with comparatively small maximum size were observed. On the other hand, as illustrated in FIG. 3C, some comparatively large opening portions of the holes with a maximum size exceeding 100 µm and some even larger opening portions, too, were also observed in each group of ceramic cores C.

Figure 6A:
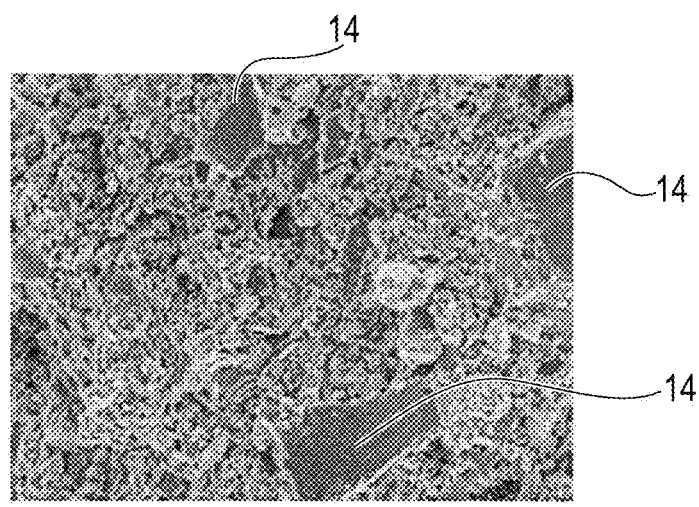
FIG. 6A is a diagram (photograph) illustrating an example of the transgranular fracture of the ceramic powder at the fracture surface of the ceramic core.
Figure 6B:
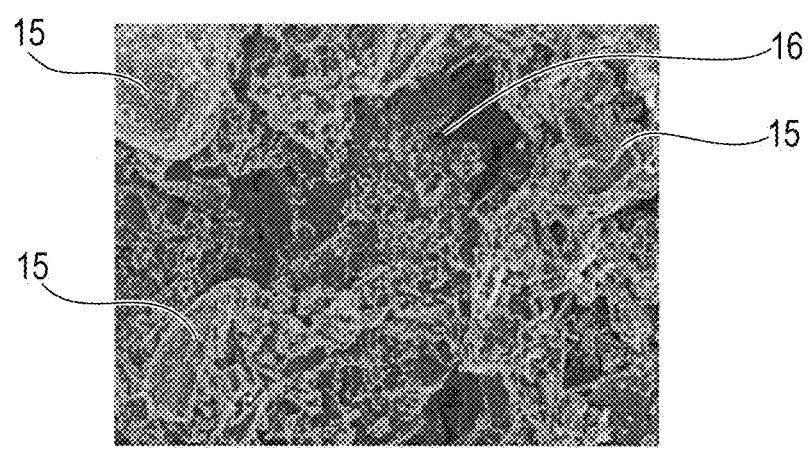
FIG. 6B is a diagram (photograph) illustrating an example of the intergranular fracture of the ceramic powder at the fracture surface of the ceramic core.

The ceramic cores (referred to as "ceramic core A'" and "ceramic core C'") selected arbitrarily from the groups of ceramic cores A and ceramic cores C were bent and ruptured. Subsequently, the observable fracture surfaces of the ceramic cores A' and C' were observed with a microscope. FIG. 6A illustrates an example of the fracture surface of the ceramic core A'. FIG. 6B illustrates an example of the fracture surface of the ceramic core C'. As illustrated in FIG. 6A, a transgranular fracture particle 14 was clearly observed at least in three areas at the fracture surface of the ceramic core A'. On the other hand, as illustrated in FIG. 6B, an intergranular fracture particle 15 of the ceramic powder with the intergranular fracture was clearly observed around the large hole 16 at the fracture surface of the ceramic core C'. As described above, the ceramic core according to the conventional technique easily causes the projection defect in the casting. Thus, it is presumed that the projection defect is easily caused in the casting by the ceramic core that easily causes the intergranular fracture because of having the sintered connected structure of the ceramic powder with comparatively low mechanical strength.

The same number of ceramic cores were selected from among each of the group of ceramic cores A, the group of ceramic cores B, and the group of ceramic cores C. As described above, the opening portion of the hole with the maximum size of more than 100 µm was not observed on the surface of the ceramic cores A and B. On the surface of the ceramic core C, the opening portion of the hole with the maximum size of more than 100 µm was observed. The casting was manufactured in fact by applying the lost wax casting method with the use of the selected ceramic core. Specifically, a lost-foam pattern was manufactured by coating each of the ceramic cores A, B, and C with a wax-based lost-foam material that is molten at a temperature of less than or equal to 200° C. Moreover, the original molds A, B, and C were manufactured by coating the lost-foam pattern with the refractory. Subsequently, the lost-foam pattern was removed by melting the wax-based lost-foam material that runs out of the inside of the original molds A, B, and C to provide the molds A, B, and C. Then, the temperature of each mold of A, B, and C was maintained at about 1500° C. by heating. In this state, the inside of the molds A, B, and C was filled with the molten metal material under the same casting condition. After that, by solidifying the metal material, the casting original models A, B, and C were manufactured. After that, the mold (refractory) was crushed and removed from the casting original models A, B, and C. Additionally, the ceramic cores A, B, and C were eluted and removed from the casting original models A, B, and C using the alkali aqueous solution.

Through the aforementioned procedure, the plural castings A, B, and C with the hollow structure were obtained. Here, the castings (group of castings) manufactured using the group of ceramic cores A and the group of ceramic cores B according to the embodiment of the present disclosure were referred to as the group of castings A and the group of castings B, respectively. Moreover, the casting (group of castings) manufactured using the group of ceramic cores C employed in the conventional technique is referred to as the group of castings C. The castings A, B, and C included in each of the groups of castings A to C were cut as appropriate. This exposed the hollow portions of the castings A, B, and C where the ceramic cores A, B, and C were in contact. The entire casting surface of the exposed hollow portion was observed with eyes and a microscope. As a result, the projection recognized as the projection defect was not observed in the hollow portion of any casting included in each group of the castings A and B. On the other hand, the projection recognized as the projection defect illustrated in FIG. 2A and FIG. 2B was observed in the hollow portion of some castings included in the group of castings C.

Thus, the effectiveness of the ceramic cores A and B according to the embodiment of the present disclosure, and the effectiveness of the manufacturing method for the ceramic cores A and B were confirmed. Moreover, the effectiveness of the manufacturing method for the castings A and B using the ceramic cores A and B according to the embodiment of the present disclosure was confirmed. Moreover, it was confirmed that the generation of the projection defect in the hollow portion in the casting manufactured by the manufacturing method for the castings A and B using the ceramic cores A and B was suppressed, and that an excellent hollow casting was obtained by the manufacturing method for the casting. The hole according to an embodiment of the present disclosure includes the hole with the space formed by the opening portion expanding in a bag-like shape from the surface to the inside, and the hole depressed from the surface to the inside, which is formed by the falloff of a large particle.

The ceramic core according to the embodiment of the present disclosure may be any of the following first to third ceramic cores.

A first ceramic core is a ceramic core formed by sintering ceramic powder, wherein an opening portion of a hole opening on a surface of the ceramic core has a maximum size of 100 μm or less.

A second ceramic core is the first ceramic core wherein a transgranular fracture particle of ceramic powder is observed at a fracture surface of the first ceramic core.

A third ceramic core is the first or second ceramic core wherein the relative density of the ceramic core is 60% or more.

A manufacturing method for a ceramic core according to the embodiment of the present disclosure may be any of the following first and second manufacturing methods for a ceramic core.

A first manufacturing method for a ceramic core includes: a step of preparing an injection molding composition by mixing ceramic powder and a binder; a step of manufacturing a ceramic compact by performing the injection molding of the injection molding composition; and a step of manufacturing a ceramic core by sintering the ceramic compact to, wherein the cumulative percentage of coarse powder with a particle diameter of more than 50 μm is 30% or less on an integrated volume particle size distribution curve of particles included in the ceramic powder.

A second manufacturing method for a ceramic core is the first manufacturing method for a ceramic core, wherein the cumulative percentage of the micropowder with a particle diameter of 5 μm or less is 10 to 40% on the integrated volume particle size distribution curve.

A manufacturing method for a casting using the ceramic core according to the embodiment of the present disclosure may include: a step of manufacturing any of the first to third ceramic cores; a step of manufacturing a lost-foam pattern by coating the ceramic core with a lost-foam material; a step of manufacturing a mold by coating the lost-foam pattern with a refractory; and a step of manufacturing a casting original model by filling the mold with a molten metal material and solidifying the metal material, wherein the mold and the ceramic core may be removed from the casting original model to form a hollow casting.

The casting manufactured by the manufacturing method for the casting using the ceramic core according to the embodiment of the present disclosure may be the casting manufacturing by the manufacturing method for the casting using the ceramic core according to the embodiment of the present disclosure.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A ceramic core including a sintered body of ceramic powder,
   wherein an opening portion of a hole present on a surface of the ceramic core has a maximum size of 100 μm or less, and
   wherein cumulative percentage of coarse powder with a particle diameter of more than 50 μm included in the ceramic powder is 30% or less on an integrated volume particle size distribution curve of the ceramic powder, the cumulative percentage of micropowder with a particle diameter of 5 μm or less in the ceramic powder is 10 to 40%, and the cumulative percentage of the micropowder with a particle diameter of 1 μm or less is less than 5%, and
   wherein the ceramic powder comprises silica powder ($SiO_2$), 0.1 to 15.0 mass % of alumina powder ($Al_2O_3$), and 0.5 to 35.0 mass % of zircon powder ($ZrSiO_4$).

2. The ceramic core according to claim 1, wherein the ceramic core has a relative density of 60% or more.

3. The ceramic core according to claim 1, wherein a fracture surface of the ceramic core includes transgranular fracture particle of ceramic powder.

4. The ceramic core according to claim 3, wherein the ceramic core has a relative density of 60% or more.

* * * * *